United States Patent
Moon

(10) Patent No.: US 9,851,025 B2
(45) Date of Patent: Dec. 26, 2017

(54) POLYMER-LINED PIPES AND FITTINGS WITH REPLACEABLE COMPONENTS

(71) Applicant: SYNCRUDE CANADA LTD. in trust for the owners of the Syncrude Project as such owners exit now and in the future, Fort McMurray (CA)

(72) Inventor: Soon Won Moon, Edmonton (CA)

(73) Assignee: SYNCRUDE CANADA LTD. in trust for the owners of the Syncrude Project as such owners exist now and in the future, Fort McMurray (CA)

( * ) Notice: Subject to any disclaimer, the term of this patent is extended or adjusted under 35 U.S.C. 154(b) by 0 days.

(21) Appl. No.: 14/860,501

(22) Filed: Sep. 21, 2015

(65) Prior Publication Data

US 2017/0082219 A1    Mar. 23, 2017

(51) Int. Cl.
*F16L 55/00* (2006.01)
*F16L 9/133* (2006.01)
*F16L 23/00* (2006.01)

(52) U.S. Cl.
CPC ............ *F16L 9/133* (2013.01); *F16L 23/003* (2013.01)

(58) Field of Classification Search
USPC ..................... 138/36, 97, 146, 155
See application file for complete search history.

(56) References Cited

U.S. PATENT DOCUMENTS

| | | | | |
|---|---|---|---|---|
| 3,149,646 A * | 9/1964 | Xenis | ..................... | F16L 21/022 137/15.11 |
| 4,011,652 A * | 3/1977 | Black | ..................... | B23P 11/00 285/53 |
| 4,684,155 A * | 8/1987 | Davis | ................... | B65G 53/523 138/139 |
| 4,706,997 A * | 11/1987 | Carstensen | ........... | E21B 17/042 285/13 |
| 4,995,427 A * | 2/1991 | Berchem | ................. | F16L 57/06 138/120 |
| 6,148,864 A * | 11/2000 | Pascoe | ................ | B29C 65/7802 138/107 |
| 6,539,981 B1 * | 4/2003 | Kleven | ..................... | G01F 1/58 138/104 |
| 8,003,181 B2 * | 8/2011 | Ishikawa | ............... | F16L 25/028 138/155 |
| 2001/0029988 A1 * | 10/2001 | Robison | ..................... | F15D 1/02 138/44 |

\* cited by examiner

*Primary Examiner* — James Hook
(74) *Attorney, Agent, or Firm* — Bennett Jones LLP

(57) ABSTRACT

A pipe or fitting having a polymer liner and a replaceable component including an outer ring having an outside diameter matching the inside diameter of the pipe or fitting, a polymer liner bonded to the outer ring and having an inside diameter matching the inside diameter of the liner of the pipe or fitting. The replaceable component is disposed in an inlet or outlet of the pipe or fitting so as to form a continuous bore lined with a polymer.

12 Claims, 11 Drawing Sheets

POLYMER-LINED PIPES AND FITTINGS WITH REPLACEABLE COMPONENTS

FIELD OF THE INVENTION

The present invention relates generally to pipes and fittings having a polymer liner, and having replaceable inlet and/or outlet components.

BACKGROUND

Due to superior wear and corrosion resistance, polymer-lined pipes and fittings have been used in many aggressive slurry services in the oil sands mining industry. Rubbers and polyurethanes are the main polymeric liner materials currently being used. Liner thickness is commensurate with length of the pipe run, and can exceed 1 inch in very long pipe runs. However, liner wear still occurs, and in particular, the inlets and outlets often experience the most serious liner wear. This is mainly due to pipe misalignment where the resultant step change in pipe inside diameter (ID) can cause so-called 'liner wash-out' due to either direct impingement from the slurry particles (prior art FIG. 1A) or slurry turbulence. The wash-out area is localized, normally less than a foot from the pipe connection between the upstream pipe (UP) and the downstream pipe (DP). Liner wear is often accelerated in that localized wear zone, resulting in early retirement of the spool even though most areas are in serviceable condition.

When there is step-change in inside diameter at pipe connection due to different inside diameters (IDs) of mating pipes (prior art FIG. 1B), transition rings can be used for smooth ID transition. Transition rings use abrasion and wear resistant alloy linings such as tungsten carbide, which introduces significant cost increase. Also, transition rings are flange-connected, thereby incorporating more pipe connection points with a resulting increase in the possibility of ID mismatch.

SUMMARY OF THE INVENTION

In one aspect, the invention may comprise a polymer-lined pipe or fitting having replaceable components, wherein the inlet and/or the outlet of the polymer-lined pipe or fitting is adapted to receive a replaceable component to form a continuous bore. The replaceable component may comprise:
  a. an outer ring having an outside diameter matching the inside diameter of the pipe or fitting; and
  b. a polymer liner bonded to the outer ring and having an inside diameter matching the inside diameter of the polymer liner of the pipe or fitting.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

This invention relates to polymer-lined pipes and fittings with replaceable inlet/outlet components (10). The replaceable component (10) comprises an outer ring (12) and an inner polymer liner (14).

The outer ring (12) is preferably a metal ring, such as steel, but may be made from any suitable rigid material which can provide structural integrity to support the replaceable component in place. The outer ring may be made of a non-metallic material such as fiberglass reinforced plastic.

The polymer liner (L) of the parent (P) pipe or fitting, and the polymer liner (14) of the replaceable component, may comprise any polymer suitable for lining pipes used for mining slurry transport, and are well known in the art. Especially, elastomers have demonstrated excellent wear performance in many slurry applications. An elastomer is a polymer having the property of elasticity, whereby the polymer deforms in response to the application of stress, and substantially recovers its original form when the stress is removed. Elastomers typically have a low Young's modulus and a high yield strain, as is well known in the art. Suitable elastomers include, without limitation, natural or synthetic rubbers, polyurethanes, thermoplastic polymers, and other thermoset polymers. Polymer liner can have fillers such as carbon black, Kevlar fibers or nano-fillers for higher wear and tear resistance, as is well known in the art.

It is preferable for the polymer liner (14) of the replaceable component to be the same or similar material as the polymer liner (L) of the pipe (P) or fitting it is installed into, to mitigate uneven wear performance throughout the pipe. In one embodiment, the polymer liner (14) is fully bonded onto the outer ring (12) such as through a molding, casting or vulcanizing process.

Figure 1A:
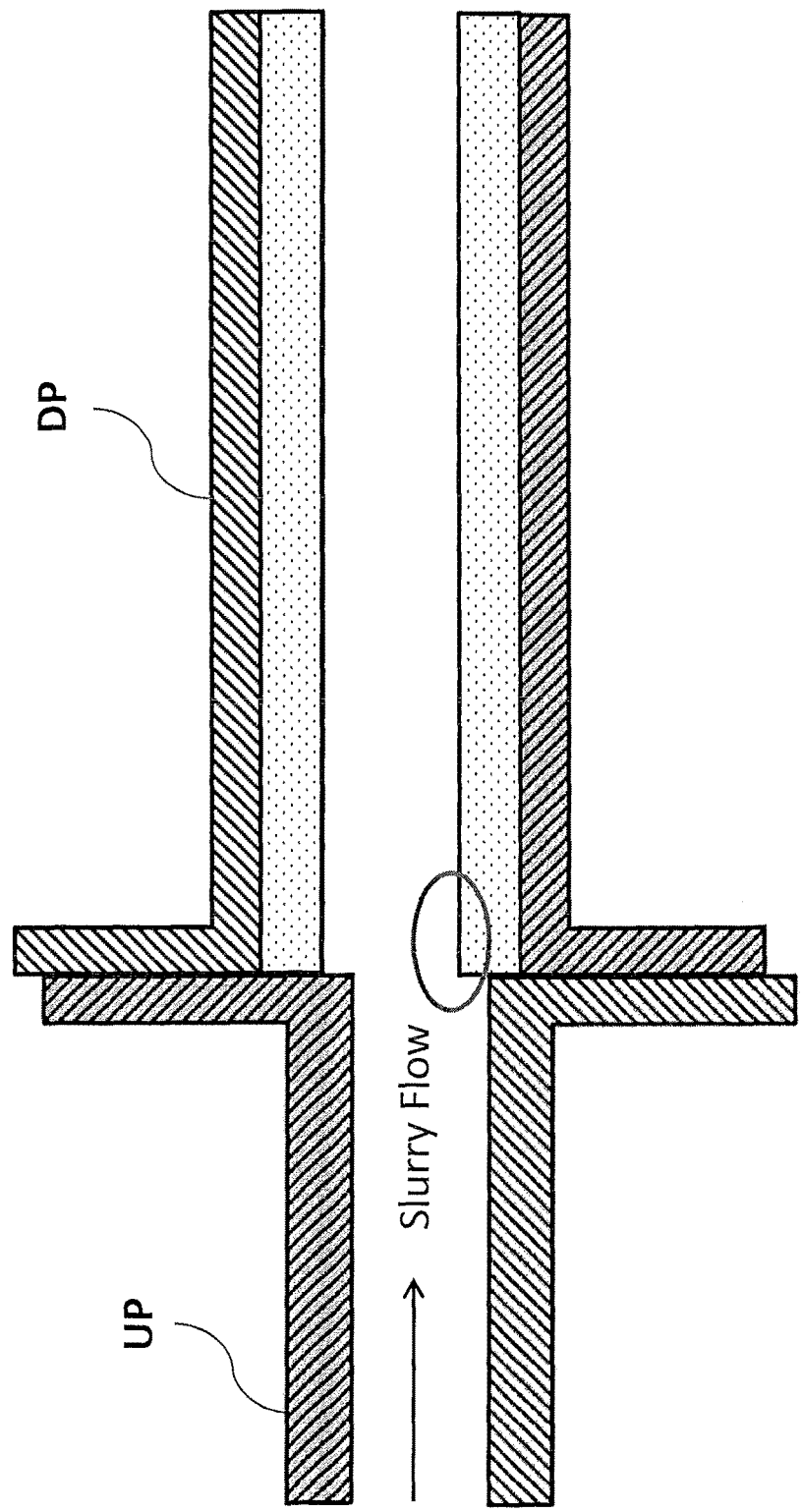
FIGS. 1A and 1B are cross-sectional views of prior art pipes assembled with an adjacent pipe or fitting, or a transition ring.
Figure 1B:
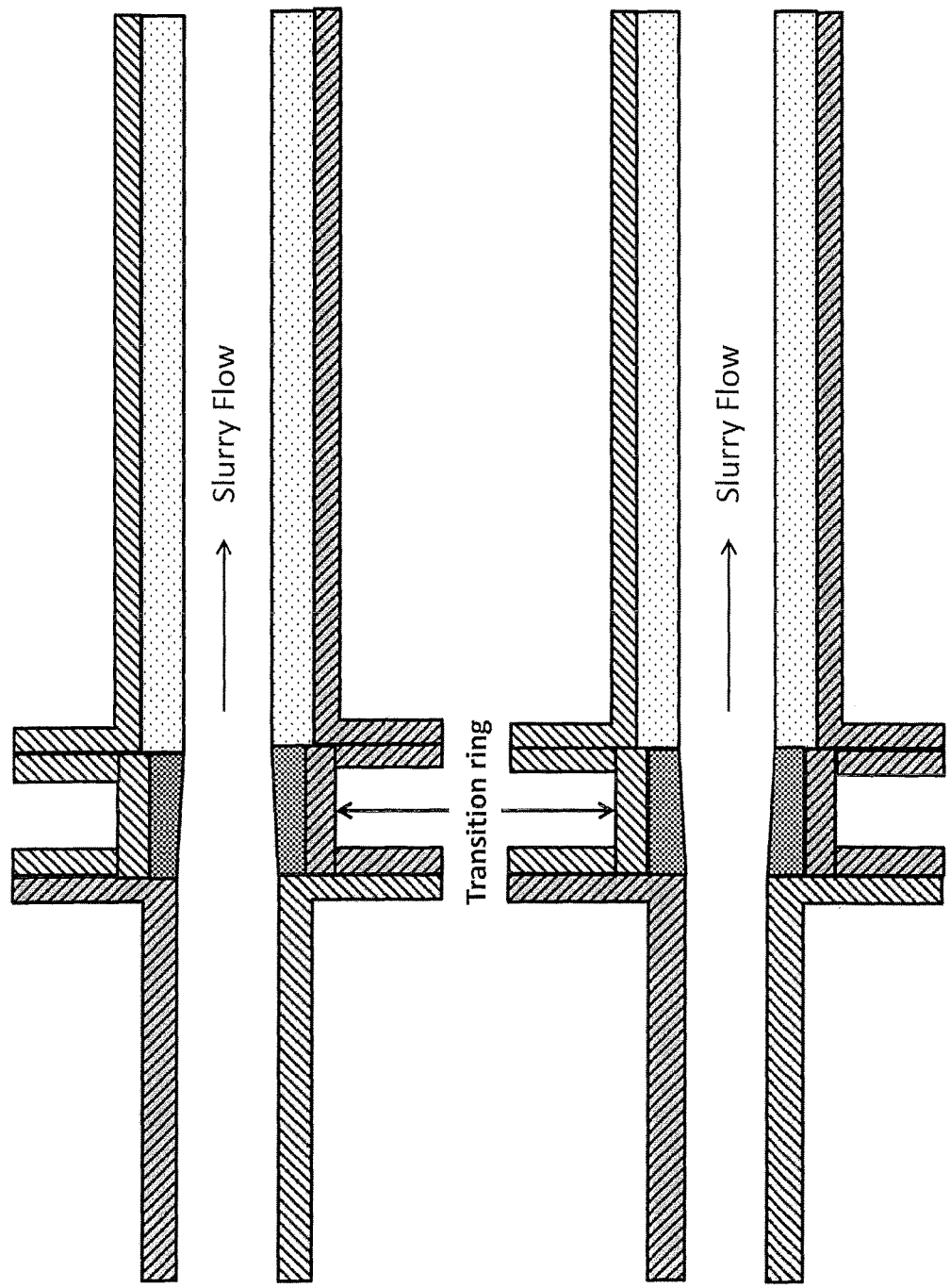
Figure 2:
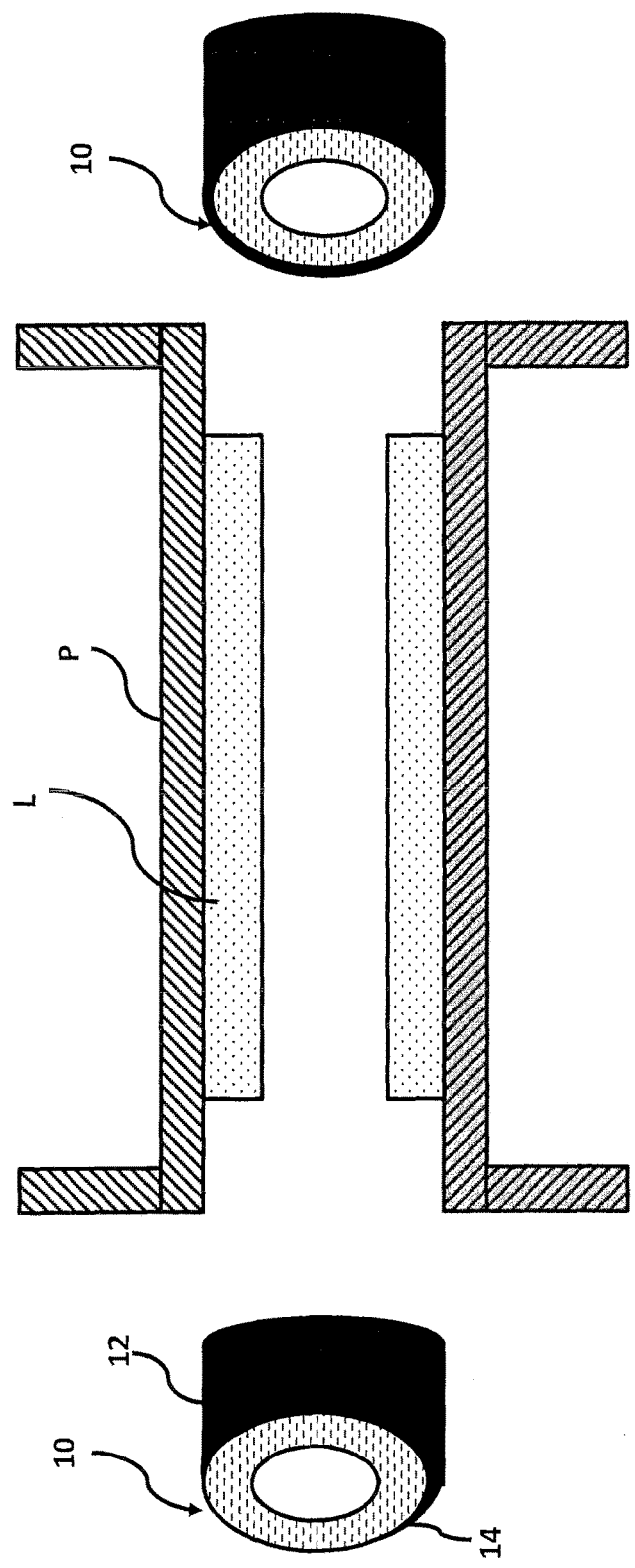
FIG. 2 is a longitudinal cross-sectional view of one embodiment of a pipe, with perspective views of replaceable components at both ends of the pipe.

The inlet and/or the outlet of the polymer-lined pipe or fitting is configured to receive the replaceable components as shown in FIG. 2. Essentially, the metallic shell of the pipe (P) extends beyond the polymer liner (L) by a distance substantially equal to the length of the replaceable component. In one embodiment, the outer diameter of the outer ring (12) should closely match the inside diameter of the pipe (P) in the groove, while the inside diameter of the polymer liner (14) of the replaceable components should closely match the inside diameter of the polymer liner (L) of the pipe (P).

Figure 3:
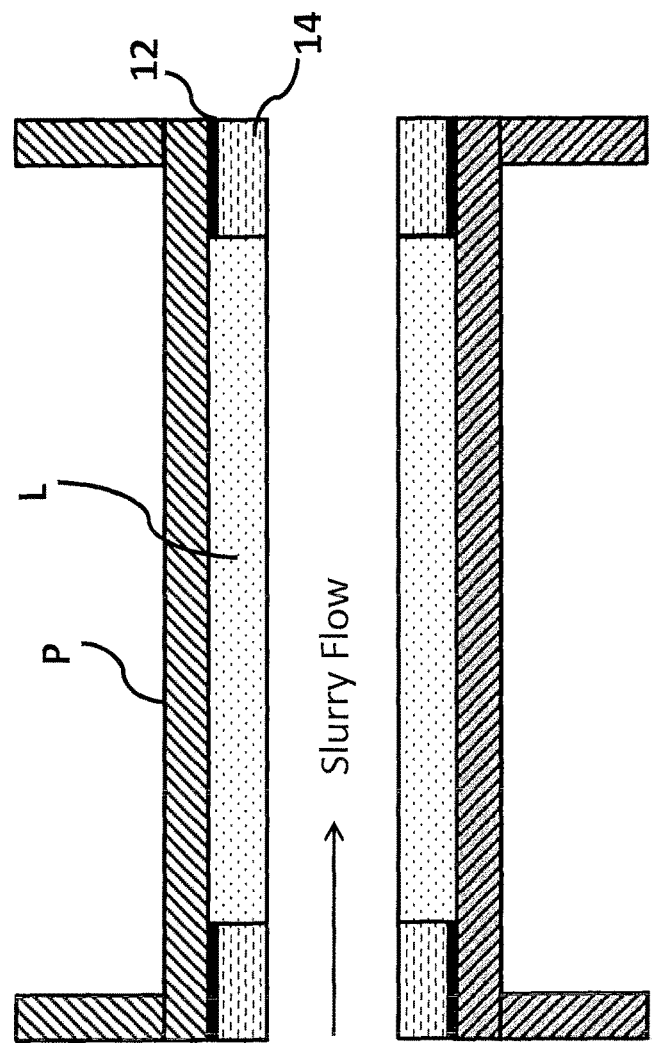
FIG. 3 is a longitudinal cross-sectional view of the embodiment shown in FIG. 2, showing the replaceable components with a square cut end.
Figure 3:
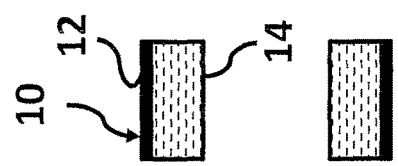
Figure 3:
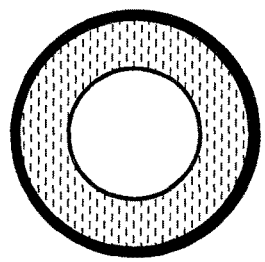
Figure 4:
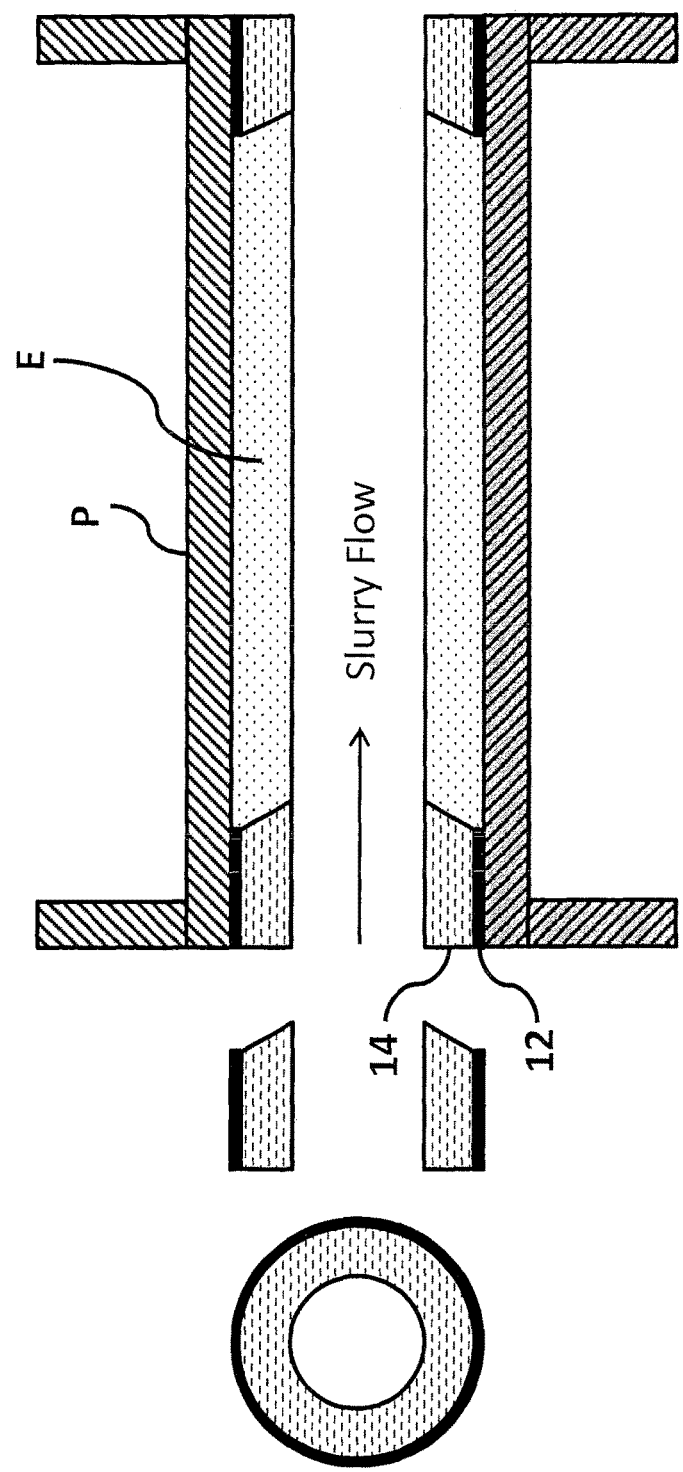
FIG. 4 is a longitudinal cross-sectional view of the embodiment shown in FIG. 2, showing the replaceable components with an angle cut end.

The end of the replaceable components can be square-cut as shown in FIG. 3 or angle-cut to make the mating interface between the replaceable component and the parent pipe away from the direction of the incoming slurry stream, as shown in FIG. 4.

Figure 5:
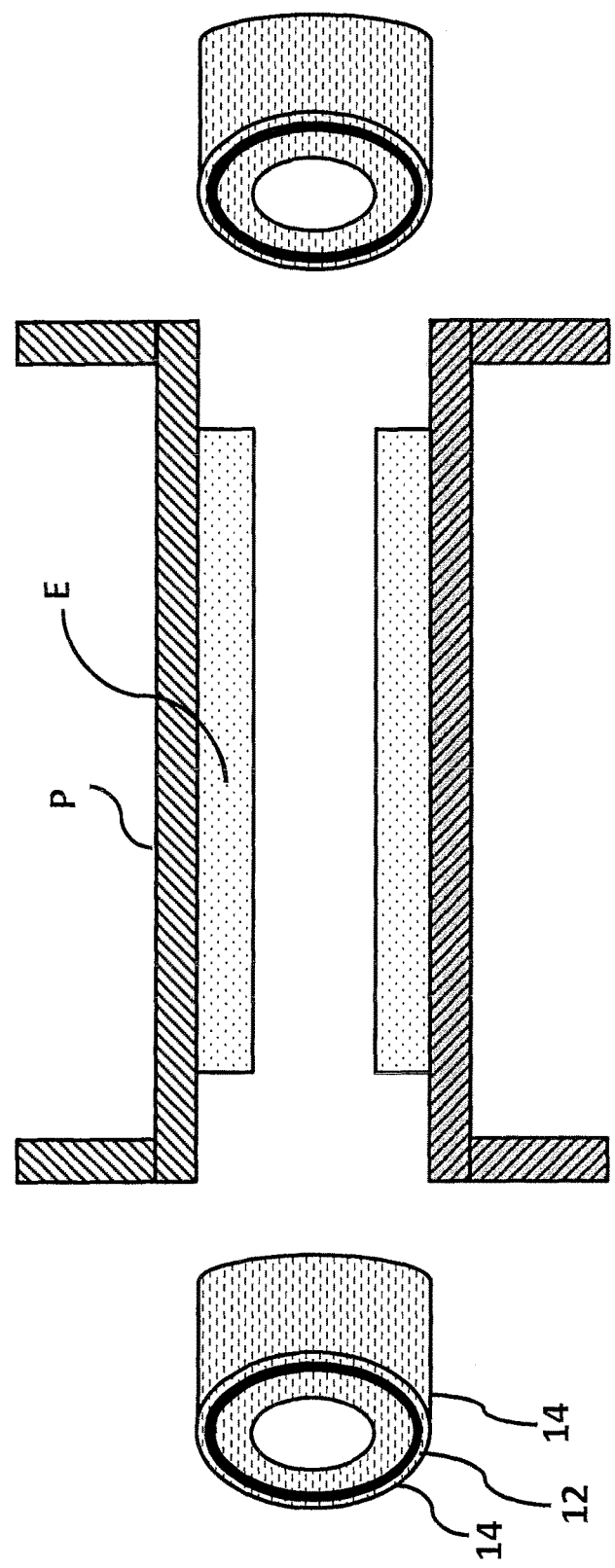
FIG. 5 is a longitudinal cross-sectional view of an alternative embodiment of FIG. 2, showing outer ring of the replaceable components is lined, coated, or encapsulated for corrosion protection.

In one embodiment, the outer ring (12) can be encapsulated by the polymer liner (14) to prevent any possible corrosion on the metallic component (FIG. 5). Alternatively, the exposed metallic surfaces in the replaceable components can be separately lined or coated. The exposed metallic surfaces of the parent pipe (P) in the groove can be lined or coated to prevent possible corrosion on the parent pipe. The replaceable components (10) can be glued to the pipe (P) or fitting for additional stability. The adhesive should have sufficient strength to provide proper stability during operation, however still allow separation when required for replacement. Sealing agents compatible with the polymer liner (L, 14), such as those found in field repair kits may also be used to fill any gaps or seams to achieve smooth bore.

Figure 6:
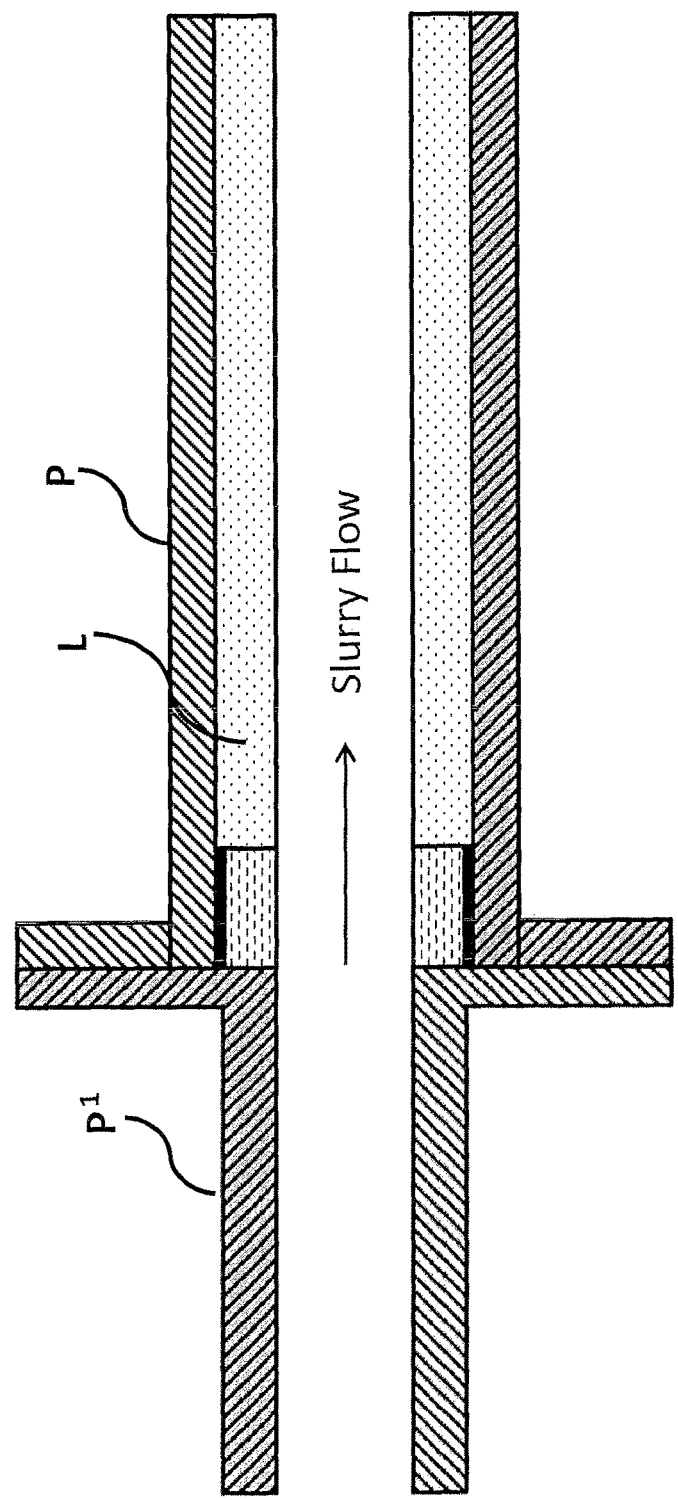
FIG. 6 is a longitudinal cross-sectional view of pipe connection, showing the replaceable component being interlocked between parent and mating pipes.
Figure 7:
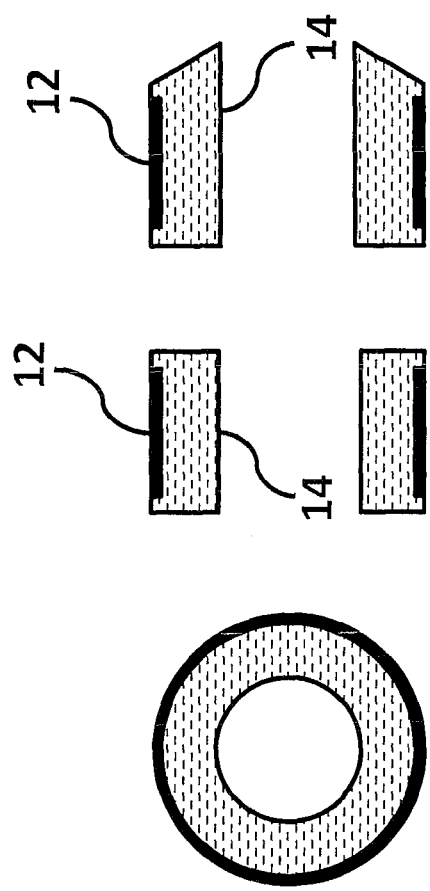
FIG. 7 is a cross-sectional view of replaceable components, showing polymer liner protruding beyond two ends of the outer ring. When interlocked between parent and mating pipes, the protruded polymer is compressed to make compression fit.

The replaceable component (10) can be interlocked between the parent pipe (P) and a mating pipe (P'), as shown in FIG. 6. A tight seal between pipes (P, P') may be achieved with tight tolerance control and a compression-fit design. For example, the polymer liner (14) in the replaceable components (10) may be slightly oversized in the axial direction, so as for polymer liner to protrude slightly beyond two ends of the outer ring (FIG. 7). Thus, when interlocked between parent and mating pipes, the protruded polymer can be compressed to make compression fit.

Figure 8:
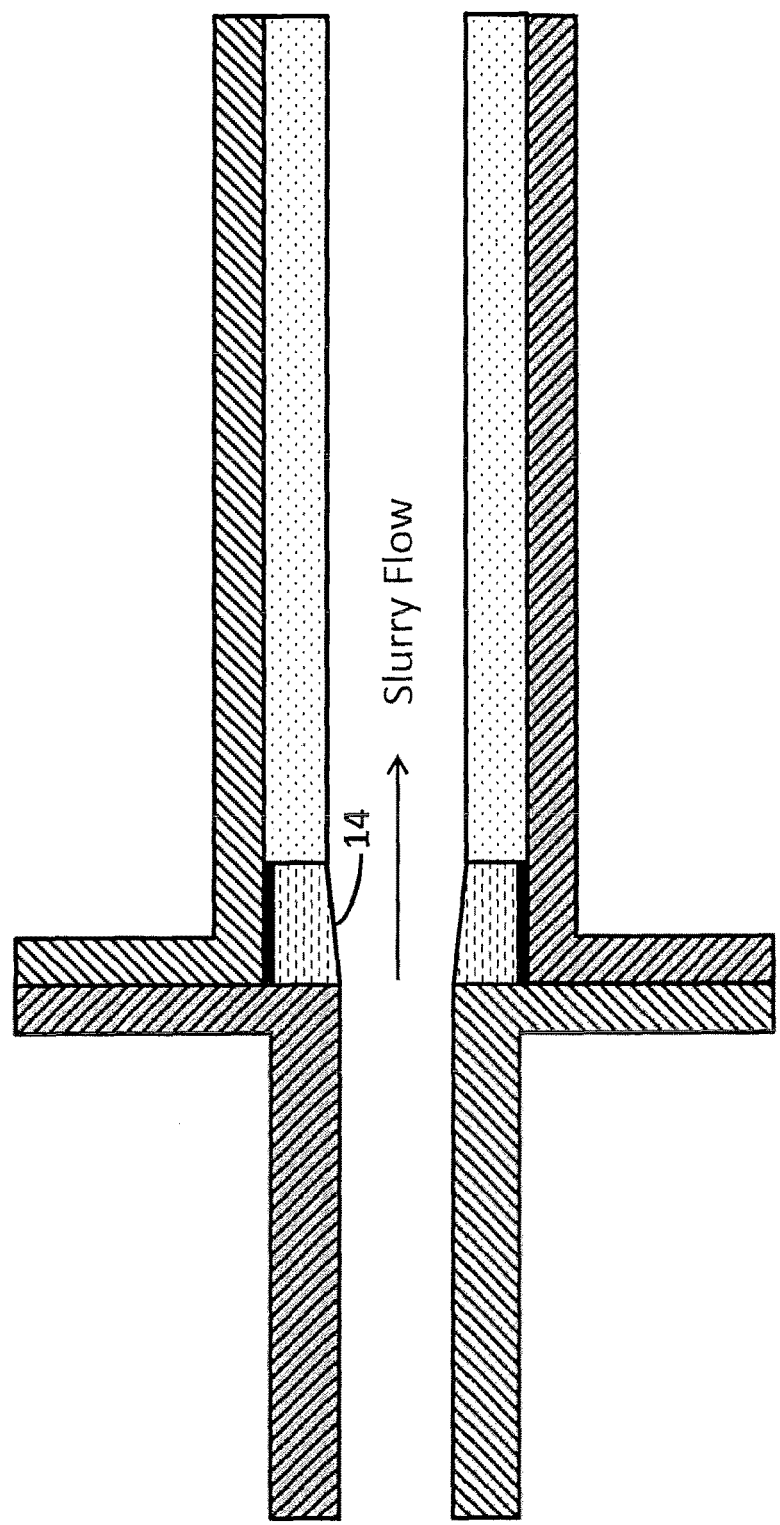
FIG. 8 is a longitudinal cross-sectional view of pipe connection, showing replaceable components with tapered liner to achieve smooth ID transition.
Figure 9:
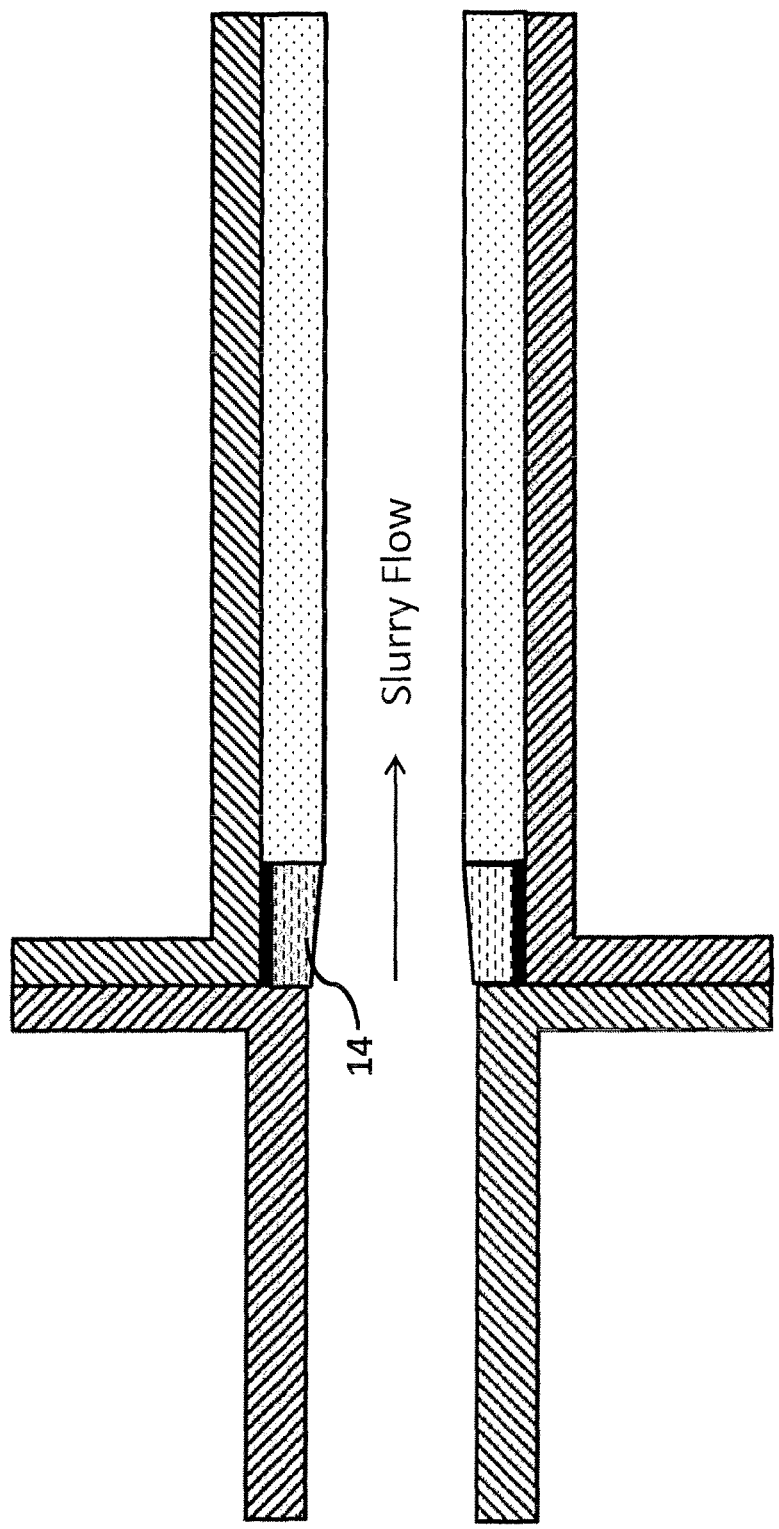
FIG. 9 is a longitudinal cross-sectional view of pipe connection, showing replaceable components with tapered liner to achieve smooth ID transition.

The polymer-lined pipes and fittings with replaceable inlet/outlet components of this invention disclosure can be used as an alternative to transition rings to accommodate mating between pipes with different inside diameters. The polymer liner (14) in the replaceable component (10) may be tapered with increasing diameter (FIG. 8) or decreasing diameter (FIG. 9) so as to form a conically shaped inner bore. In each case, the smooth transition in inside diameter can be achieved at the pipe connection. The polymer liner (14) may be tapered by molding or casting in the desired shape, or by machining flat-faced liner.

Figure 10:
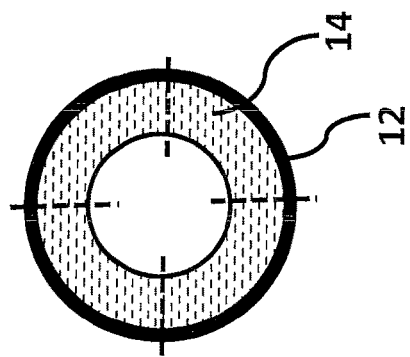
FIG. 10 shows cross-sectional views of a replaceable component, each showing a replaceable component assembled from multiple sections.
Figure 10:
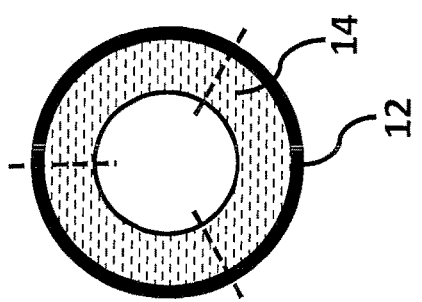
Figure 10:
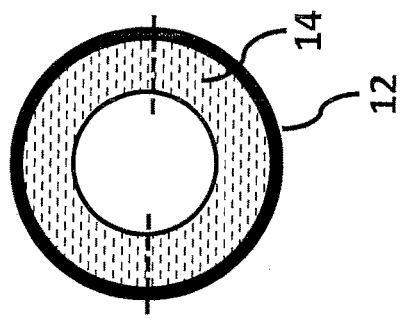

For easy rotation or replacement, the replaceable components can be sectioned into multiple pieces (i.e. two, three or four pieces) as shown in FIG. 10.

Once the replaceable component has serious liner wear on the bottom, only the replaceable component can be rotated. This can bring significant benefits in maintenance compared to rotating the entire pipe or fitting. Once the replaceable component seriously worn out around the circumference, only the replaceable component can be replaced. This can bring significant benefits in maintenance compared to replacing the entire pipe or fitting.

It is believed by using the replaceable inlet/outlet components (10) described herein, the lifecycle of the polymer-lined pipes or fittings can be extended. Also, it is hoped that by using the replaceable components with tapered liner, significant cost benefit can be achieved by avoiding use of expensive transition rings.

Definitions and Interpretation

The singular forms "a," "an," and "the" include plural reference unless the context clearly dictates otherwise. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation, The terms "preferably," "preferred," "prefer," "optionally," "may," and similar terms are used to indicate that an item, condition or step being referred to is an optional (not required) feature of the invention.

The term "and/or" means any one of the items, any combination of the items, or all of the items with which this term is associated. The phrase "one or more" is readily understood by one of skill in the art, particularly when read in context of its usage.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range of values includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

As will be apparent to those skilled in the art, various modifications, adaptations and variations of the foregoing specific disclosure can be made without departing from the scope of the invention claimed herein. The various features and elements of the invention described herein may be combined in a manner different than the specific examples described or claimed herein without departing from the scope of the invention. In other words, any element or feature may be combined with any other element or feature in different embodiments, unless there is an obvious or inherent incompatibility between the two, or it is specifically excluded.

What is claimed is:

1. A polymer-lined pipe or fitting having replaceable components, wherein the inlet and/or the outlet of the polymer-lined pipe or fitting defines a groove configured to receive a replaceable component to form a continuous bore, the replaceable component comprising:
    (a) an outer ring having an outside diameter matching the inside diameter of the pipe or fitting in the groove; and
    (b) a polymer liner bonded to the outer ring and having an inside diameter matching the inside diameter of the polymer liner of the pipe or fitting.

2. The pipe or fitting of claim 1 wherein the outer ring of the replaceable component is made of metal or fiberglass-reinforced plastics.

3. The pipe or fitting of claim 1 wherein the polymer of the replaceable component comprises a natural or synthetic rubber, a polyurethane, a thermoplastic polymer, or a thermoset polymer.

4. The pipe or fitting of claim 1 wherein the polymer liner of the replaceable component is the same or similar to the polymer liner of the pipe or fitting.

5. The pipe or fitting of claim 1 wherein the replaceable components have a square-cut or an angle-cut face which abuts the liner of the pipe or fitting.

6. The pipe or fitting of claim 1 wherein all the exposed surfaces of the replaceable components are lined, coated or encapsulated with polymer.

7. The pipe or fitting of claim 6 wherein all the exposed surfaces in the pipe or fitting are lined, coated or encapsulated with polymer.

8. The pipe or fitting of claim 1 wherein the replaceable components are bonded into the pipe or fitting.

9. The pipe or fitting of claim 1 wherein all the gaps or seams around the replaceable components are filled with sealing agents to make a smooth bore.

10. The pipe or fitting of claim 1 wherein the polymer liner protrudes slightly beyond at least one end of the outer ring to allow for compression fit when interlocked between two pipes or fittings.

11. The pipe or fitting of claim 1 wherein the polymer liner of the replaceable components is tapered to achieve smooth ID transition when connected to a pipe or fitting having different ID.

12. The pipe or fitting of claim 1 wherein the replaceable components comprise multiple sections assembled together.

* * * * *

UNITED STATES PATENT AND TRADEMARK OFFICE
CERTIFICATE OF CORRECTION

PATENT NO. : 9,851,025 B2  
APPLICATION NO. : 14/860501  
DATED : December 26, 2017  
INVENTOR(S) : Soon Won Moon Page 1 of 1

It is certified that error appears in the above-identified patent and that said Letters Patent is hereby corrected as shown below:

On the Title Page

Item (71) Applicant reads "SYNCRUDE CANADA LTD. in trust for the owners of the Syncrude Project as such owners exit now and in the future, Fort McMurray (CA)". It should read "SYNCRUDE CANADA LTD. in trust for the owners of the Syncrude Project as such owners exist now and in the future, Fort McMurray (CA)".

Signed and Sealed this  
Twelfth Day of March, 2019

Andrei Iancu  
*Director of the United States Patent and Trademark Office*